United States Patent [19]

Campbell et al.

[11] Patent Number: 4,713,231

[45] Date of Patent: Dec. 15, 1987

[54] PROCESS FOR THE RECOVERY OF AMMONIA AND FLUORIDE VALUES FROM AMMONIUM FLUORIDE SOLUTIONS

[75] Inventors: Kent D. Campbell, Concord; Laura J. Dietsche, Berkeley; Lee B. Crampton, Concord; Keith D. Hovda, Antioch; George K. Tyson, Walnut Creek; Charles A. Wilson, Pittsburg, all of Calif.

[73] Assignee: The Dow Chemical Company, Midland, Mich.

[21] Appl. No.: 887,587

[22] Filed: Jul. 21, 1986

[51] Int. Cl.$^4$ .................................................. C01B 7/19
[52] U.S. Cl. .................................. 423/356; 159/47.1; 203/12; 203/14; 260/694; 423/490; 546/345
[58] Field of Search ............... 203/12, 14; 423/356, 423/490; 159/47.1

[56] References Cited

U.S. PATENT DOCUMENTS

| | | | |
|---|---|---|---|
| 1,581,819 | 4/1926 | Siegel | 423/490 |
| 2,285,093 | 6/1942 | Kokatnur | 203/12 |
| 2,339,160 | 1/1944 | Dunn et al. | 203/14 |
| 2,527,320 | 10/1950 | McHarness et al. | 203/12 |
| 3,842,161 | 10/1974 | Hyoky | 423/490 |

FOREIGN PATENT DOCUMENTS

| | | |
|---|---|---|
| 529852 | 11/1940 | United Kingdom ............... 203/12 |
| 1306517 | 2/1973 | United Kingdom . |
| 1340421 | 12/1973 | United Kingdom . |

*Primary Examiner*—John Doll
*Assistant Examiner*—Wayne A. Langel

[57] ABSTRACT

The components of aqueous ammonium fluoride solutions are recovered as ammonia and potassium fluoride by adding potassium hydroxide, distilling to remove and secure the ammonia, concentrating the remaining solution and combining it with a water soluble, dipolar, aprotic solvent, such as N-methylpyrrolidone, and distilling to remove the remaining water to obtain the potassium fluoride as a slurry in the solvent. Slurries of potassium fluoride are useful in the replacement of chloride in heterocyclyl and aryl chlorides by fluoride.

20 Claims, No Drawings

PROCESS FOR THE RECOVERY OF AMMONIA AND FLUORIDE VALUES FROM AMMONIUM FLUORIDE SOLUTIONS

BACKGROUND OF THE INVENTION

Aqueous solutions of ammonium fluoride are produced as by-products in chemical processes involving the replacement of fluoride by ammonia, such as in the production of 4-amino-3,5-dichloro-2,6-difluoropyridine from 3,5-dichloro-2,4,6-trifluoropyridine, and in many other processes. Aqueous ammonium fluoride solutions are also used in frosting glass and in metal pickling processes. Disposal of these solutions as waste is difficult since fluoride ion is considered to be a hazardous waste and disposal further results in the loss of valuable raw materials. These costs and environmental factors make it important to find ways to recover both the ammonia and the fluoride values from aqueous mixtures containing ammonium fluoride.

Ammonia is conventionally recovered from many ammonium salt solutions by basifying and subsequently distilling to remove the liberated ammonia.

Previously utilized methods of removing fluoride ion from dilute aqueous solutions include precipitation as calcium fluoride, collection in an ion exchange medium, and distillation as hydrogen fluoride. The fluoride containing mixtures obtained are generally discarded.

Ammonium fluoride solutions prepared by the action of aqueous ammonia on fluorosilicic acid have been utilized in the commercial production of calcium fluoride by precipitation with lime. The ammonia is recycled in the conventional way in this process. Additionally, aqueous ammonium fluoride solutions have been dehydrated and the resulting dry crystals pyrolyzed to produce ammonium bifluoride. In other operations, the ammonia and fluoride values of aqueous ammonium fluoride solutions have been recovered by evaporation and subsequent treatment with sulfuric acid at high temperatures to obtain hydrogen fluoride as a distillate and ammonium bisulfate or, after ammonation, ammonium sulfate as a solid residue. This process is known to involve large evaporation and filtration costs and to require a nearby market for ammonium sulfate.

It is, therefore, of economic importance to discover improved methods of recovering in useful forms the ammonia and fluoride ion values present in aqueous ammonium fluoride solutions.

SUMMARY OF THE INVENTION

The present invention relates to a process for the recovery of both the ammonia and the fluoride ion values of aqueous ammonium fluoride solutions.

It has now been found that the ammonia and fluoride values can be recovered from aqueous ammonium fluoride solutions by treating the solutions with potassium hydroxide and recovering the values as ammonia and potassium fluoride.

In accordance with the invention, potassium fluoride is recovered from aqueous solutions as a slurry comprising potassium fluoride in a water soluble, dipolar, aprotic solvent in a process which comprises combining the solution with the solvent and distilling to remove water. Aqueous potassium fluoride solutions are typical sources of the aqueous ammonium fluoride solutions employed. Potassium hydroxide is combined with the aqueous ammonium fluoride solution, ammonia is removed by heating, and, optionally, the resultant aqueous potassium fluoride solution is concentrated by removing water.

In a preferred embodiment, ammonia and fluoride are recovered from aqueous solutions comprising ammonium fluoride by a process which comprises:

(a) combining the ammonium fluoride solution with potassium hydroxide to obtain an aqueous solution comprising ammonia and potassium fluoride;

(b) heating the obtained solution to remove ammonia and collecting the ammonia removed;

(c) removing any water from the ammonia-removed solution required to achieve a concentration of potassium fluoride of at least 20 percent;

(d) combining a water soluble, dipolar, aprotic solvent with the concentrated solution; and (e) distilling to remove water and retrieve the fluoride as a slurry of potassium fluoride in the solvent.

The critical chemical reaction of the process can be illustrated as follows:

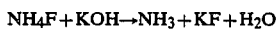

The ammonia formed, of course, is present in aqueous media in equilibrium with ammonium hydroxide, but to facilitate discussion, it is treated as simply a solution of ammonia in water for the purposes of this application.

DETAILED DESCRIPTION OF THE INVENTION

The ammonia and fluoride values of aqueous solutions containing ammonium fluoride as the primary solute can be recovered using the process of the present invention irrespective of the source of the solution. High concentrations of ammonia in the solutions are not deleterious to the process. Such solutions are typically found as by-product streams in ammonation reactions of organic fluorine compounds and in glass frosting and metal pickling operations. A suitable solution, for example, is obtained as a by-product in the conversion of 3,5-dichloro-2,4,6-trifluoropyridine to 4-amino-3,5-dichloro-2,6-difluoropyridine by treatment with aqueous ammonia.

Potassium hydroxide can be employed either as a solid or as an aqueous solution and can be combined with the aqueous ammonium fluoride solutions to be subjected to the process in any convenient manner. For example, it can be added to the ammonium fluoride solution or the ammonium fluoride solution can be added to it. The combination can be made at any temperature or pressure and is normally made under ambient conditions. The combination can be made gradually or all at once, with or without agitation. It is preferred to combine these agents gradually with agitation. It is further preferred to make the addition in a vessel with controlled openings to prevent the ammonia formed from escaping to the atmosphere.

The purity of the potassium fluoride recovered in the process is partially dependent upon the amount of potassium hydroxide employed. Potassium hydroxide in excess of an amount equimolar to the amount of fluoride ion present results in recovered potassium fluoride containing potassium hydroxide whereas less than an equimolar amount results in recovered potassium fluoride containing potassium bifluoride. It is generally preferred to employ an amount essentially equimolar to the fluoride ion contained in the aqueous ammonium fluoride solution, but useful products are obtained with other amounts and, in some cases, an excess or insufficiency may even be preferred.

The ammonia formed on the addition of potassium hydroxide is partially soluble in water. That in excess of solubility is rapidly volatilized on addition of potassium hydroxide. Essentially all of the remaining ammonia can be volatilized by heating the solution at the boiling point or by heating to near boiling and passing steam through the solution. The volatilized ammonia is further distilled to obtain anhydrous ammonia or it is absorbed in water to obtain aqueous ammonia. Other conventional methods of collecting ammonia can also be employed. In some cases it may be necessary to subsequently remove organic compounds that were present in the initial solution and are volatile with steam from the ammonia collected before it can be reused. This can be done by conventional methods, such as decantation or extractions.

The ammonia removal activity is generally continued until the remaining solution is essentially ammonia free or until the concentration of ammonia in the volatilized fraction is too low to permit economic recovery. The ammonia-removed solution so obtained is a suitable substitute solution for fluoride recovery. Aqueous solutions containing potassium fluoride as the primary solute obtained in other ways are equally suitable.

The solution remaining after the removal of ammonia is next optionally concentrated by removal of water. This is done for convenience and to minimize raw material and energy costs. Water removal is conveniently accomplished by distillation at atmospheric or reduced pressure using conventional equipment and techniques. It can, however, also be accomplished by other means, such as by evaporation, by the use of semi-permeable membranes, by selective absorbants, and the like.

The removal of water is usually continued until the concentration of potassium fluoride in the remaining solution is at least 20 percent. It is preferred to concentrate to a solution containing at least 30 percent potassium fluoride and especially preferred to concentrate to at least 40 percent. The concentration step is, of course, omitted if the potassium fluoride solution as obtained is already suitably concentrated.

A water soluble, dipolar, aprotic solvent is combined with the potassium fluoride concentrate in the following step of the process. The result is a solution or a multiphase two phase system depending on the amount of water present, the temperature, and the water to solvent ratio. Sufficient solvent is used so that the final product of the process will be a mobile slurry of potassium fluoride in the solvent. Generally, an amount of solvent that will produce a final slurry containing about 3 to about 35 percent potassium fluoride is employed. It is preferred to use an amount that will produce a slurry containing about 5 to about 25 percent potassium fluoride and most preferred to use an amount that will produce a slurry containing about 8 to about 20 percent.

The solvent and potassium fluoride concentrate can be combined at any convenient temperature or pressure and in any way. It is often convenient to add the solvent to the concentrated solution. The addition is generally done while the concentrated solution is still hot from previous operations and is best done with good agitation. It is also often convenient to add the concentrated solution to the solvent. In a preferred embodiment of the process the concentrated solution is added to the hot solvent as a spray. This procedure facilitates the precipitation of small particles of potassium fluoride which readily form mobile slurries.

Water soluble, dipolar, aprotic solvents which distill above the boiling point of water can generally be employed in the process. Examples of suitable solvents include dimethylformamide, dimethylacetamide, N-methylpyrrolidone, N-cyclohexylpyrrolidone, dimethyl sulfoxide, and sulfolane. N-methylpyrrolidone is preferred.

The remaining water is next removed as a distillate by fractionation of the hydrous potassium fluoride-solvent slurry. Any conventional batch or continuous distillation equipment and procedure can be used, but it is preferred to use an apparatus having means for agitation in the pot. Depending upon the column efficiency and the solvent employed, it may be necessary to coincidentally remove some of the solvent as distillate in order to obtain a sufficiently water-free final product. Distillation is continued until the slurry contains insufficient water to appreciably affect its intended use in a deleterious way. Generally, the water content of the final product is reduced to less than 1 percent. Preferably, it is reduced to less than 0.1 percent and most preferably to less than 0.02 percent.

The individual operations of the present invention can be carried out in separate equipment or multiple individual operations can be carried out in the same equipment. It is often convenient to carry out all of the operations sequentially in a single apparatus. Thus, for example, the aqueous ammonium fluoride solution is placed in a batch distillation apparatus, preferably equipped with means for agitation and at least one set of fractionation columns. The solution is heated under agitation, potassium hydroxide is added, and the ammonia removed by distillation and collected. The distillation is continued to remove water and concentrate the solution. A water soluble, dipolar, aprotic solvent is then added to the agitated, hot, concentrated solution and distillation continued until the water removal is complete.

Slurries of potassium fluoride in dipolar, aprotic solvents are useful for the conversion of aryl and heterocyclyl chlorides to aryl and heterocyclyl fluorides. For example, pentachloropyridine is known (J. Chem. Soc., 1964, 594–7) to react with potassium fluoride in dipolar, aprotic solvents including N-methylpyrrolidone and sulfolane to produce 3,5-dichloro-2,4,6-trifluoropyridine. Aryl and heterocyclyl fluorides are useful as chemical intermediates, as dye bonding agents, and in a variety of other applications.

The following examples are presented to illustrate the process and should not be construed as limiting the scope.

EXAMPLE 1

Potassium hydroxide (24 g of 85 percent pellets, 0.36 mole) was combined with 24 g of ice and the resulting solution was placed in a 500 ml round bottom flask equipped with a mechanical stirrer and a take-off tube, the outlet of which was connected to a condenser and a dry ice trap in sequence. A 100 ml (101.2 g) portion of an aqueous solution containing 4.7 moles/l of ammonium fluoride (as determined by a fluoride ion specific electrode) and some ammonia, which solution was obtained as a by-product from the reaction of aqueous ammonia and 3,5-dichloro-2,4,6-trifluoropyridine, was added with stirring at the rate of about 10 ml per min. The resulting mixture, which had a pH of 12–13, was allowed to stand overnight. The residual ammonia and some excess water were distilled from the resulting solution at 70°-100° C. and atmospheric pressure to recover 69.1 g of aqueous ammonia. The pressure was carefully reduced and the hot solution remaining, which contained about 30-40 percent potassium fluoride, was slowly diluted with 150 ml of N-methylpyrrolidone so as to keep the temperature above 80° C. Another 59.3 g of water was removed by distillation at 60°-65° C. and 60 mm Hg pressure and condensed. The dry ice trap contained about 6 g of ammonia at this point. The take-off tube was replaced by a 10 tray column, 50 ml of N-methylpyrrolidone was added and the remaining mixture distilled at 100 mm Hg pressure and up to about 120° C. to obtain 11.4 g of distillate. The distillation was continued at 25 mm Hg pressure and 90°-100° C. to obtain another 12.4 g distillate. The water content of the residual potassium fluoride in N-methylpyrrolidone slurry was found by Karl Fischer titration to be about 219 ppm. This slurry was successfully used for the conversion of pentachloropyridine to 3,5-dichloro-2,4,6-trifluoropyridine.

EXAMPLE 2

A 100 ml aqueous ammoniacal ammonium fluoride solution, obtained as a by-product in the reaction of aqueous ammonia with 3,5-dichloro-2,4,6-trifluoropyridine, containing 0.31 mole fluoride ion and 0.59 mole of ammonia (as determined by ion-specific electrode analysis) was added with vigorous stirring to 25.4 g of aqueous solution containing 0.26 mole of potassium hydroxide in a 2 l flask equipped with a mechanical stirrer, heating mantle, and take-off tube with a condenser and a dry ice cooled trap in sequence. Gas evolution began immediately. The mixture was heated to reflux with stirring to distill off the ammonia. About 53 g of distillate consisting of ammonia and water was collected in the condenser. N-methylpyrrolidone (250 ml) was added with stirring to the remaining approximately 60 ml of hot aqueous solution at a rate so that the pot temperature remained above 95° C. Distillation was continued. Another 250 ml of N-methylpyrrolidone was added as before, and distillation continued until the head temperature was approximately 200° C. The total distillate obtained after solvent addition was about 76 g, some of which was N-methylpyrrolidone. The remaining potassium fluoride slurry contained some potassium bifluoride. It was used for the conversion of pentachloropyridine to 3,5-dichloro-2,4,6-trifluoropyridine.

EXAMPLE 3

Potassium hydroxide (100 g of 85 percent pellets, 1.5 mole) and 80 g of ice were combined in a 2 l stainless steel round bottom flask equipped with an inlet port, a mechanical stirrer, a thermometer, and a 5 tray column and condenser assembly with a vent and a scrubber containing 250 ml of water attached on the outlet. A 500 ml aqueous ammoniacal ammonium fluoride solution prepared by dissolving 55.6 g (1.5 moles) of ammonium fluoride and 88.4 g of 29 percent aqueous ammonia (1.5 moles) in water was added to this dropwise with agitation over a 15 minute period. The flask was then heated over a 2 hour period to a head temperature of 100° C. to drive off ammonia. Heating was continued until about 100 ml of water was obtained as distillate. The distillate and scrubber were combined to obtain 395 ml of aqueous ammonia. Another 94 ml of water was removed by distillation. Analysis of the remaining solution by ion-specific electrode analysis indicated a pH of 13.9, 3.83 molar potassium ion, 3.89 molar fluoride ion, and $3.65 \times 10^{-3}$ molar ammonia. The scrubber was 5.72 molar in ammonia (2.25 moles, 75 percent recovery) and the second aqueous cut was 0.11 molar in ammonia (0.01 mole, 0.3 percent of total possible). A 1.5 l quantity of N-methylpyrrolidone was added and the mixture was distilled with stirring until the head temperature reached 200°-205° C. to obtain about 450 ml of distillate. The residual slurry contained about 0.13 percent water by Karl Fischer titration. Distillation was continued at 100 mm Hg pressure and another 50 ml of solvent removed to obtain an approximately 6.2 percent slurry of potassium fluoride in N-methylpyrrolidone containing about 0.03 percent water.

What is claimed is:

1. A process for recovering ammonia and fluoride from aqueous solutions comprising ammonium fluoride which process comprises:
   (a) combining the ammonium fluoride solution with potassium hydroxide to obtain an aqueous solution comprising ammonia and potassium fluoride;
   (b) heating the obtained solution to remove ammonia and collecting the ammonia removed;
   (c) removing any water from the ammonia-removed solution required to achieve a concentration of potassium fluoride of at least 20 percent;
   (d) combining a water soluble, dipolar, aprotic solvent with the concentrated solution; and
   (e) distilling to remove water and retrieve the fluoride as a slurry of potassium fluoride in the solvent.

2. A process according to claim 1 wherein the solvent is dimethylformamide, dimethylacetamide, N-methylpyrrolidone, dimethyl sulfoxide, or sulfolane.

3. A process according to claim 2 wherein the solvent is N-methylpyrrolidone.

4. A process according to claim 1 wherein about one mole of potassium hydroxide is added for each mole of fluoride ion present in the ammonium fluoride solution.

5. A process according to claim 1 wherein in step (c) the water is removed by distilling the ammonia-removed solution.

6. A process according to claim 1 wherein in step (d) the concentrated solution is combined with the solvent by adding the solvent to the concentrated solution with agitation.

7. A process according to claim 1 wherein in step (d) the concentrated solution is combined with the solvent by spraying the concentrated solution onto the solvent.

8. A process according to claim 1 wherein the process is carried out sequentially in one apparatus.

9. A process according to claim 1 wherein the aqueous ammonium fluoride solution is the by-product of a reaction between ammonia and an organofluorine compound.

10. A process according to claim 1 wherein the slurry of potassium fluoride in a dipolar, aprotic solvent is thereafter used as a starting material in the replacement of chloride in an organochlorine compound by fluoride.

11. A process according to claim 10 wherein the organochlorine compound is pentachloropyridine.

12. A process for preparing a slurry comprising potassium fluoride in a water soluble, dipolar, aprotic solvent which process comprises combining an aqueous solution comprising potassium fluoride with the solvent and distilling to remove water.

13. A process according to claim 12 wherein the solvent is dimethylformamide, dimethylacetamide, N-methylpyrrolidone, dimethyl sulfoxide, or sulfolane.

14. A process according to claim 13 wherein the solvent is N-methylpyrrolidone.

15. A process according to claim 12 wherein the potassium fluoride solution is combined with the solvent by adding the solvent to the solution with agitation.

16. A process according to claim 12 wherein the potassium fluoride solution is combined with the solvent by spraying the solution onto the solvent.

17. A process according to claim 12 wherein the aqueous potassium fluoride solution is concentrated to at least 20 percent by removing water before being combined with the solvent.

18. A process according to claim 12 wherein the aqueous potassium fluoride solution utilized is obtained by a method comprising combining an aqueous ammonium fluoride solution with potassium hydroxide and heating to remove the ammonia formed.

19. A process according to claim 18 wherein the aqueous ammonium fluoride solution utilized is the by-product of a reaction between ammonia and an organofluoride compound.

20. A process according to claim 12 wherein the slurry of potassium fluoride in a dipolar, aprotic solvent is thereafter used as a starting material in the replacement of chloride in an organochlorine compound by fluoride.

* * * * *